US008152307B2

(12) United States Patent
Duelli et al.

(10) Patent No.: US 8,152,307 B2
(45) Date of Patent: Apr. 10, 2012

(54) DIFFRACTIVE OPTICAL ELEMENT HAVING PERIODICALLY REPEATING PHASE MASK AND SYSTEM FOR REDUCING PERCEIVED SPECKLE

(75) Inventors: Markus Duelli, Seattle, WA (US); Alban N. Lescure, Redmond, WA (US); Mark O. Freeman, Snohomish, WA (US); Christian Dean DeJong, Sammamish, WA (US); Joshua M. Hudman, Sammamish, WA (US)

(73) Assignee: Microvision, Inc., Redmond, WA (US)

( * ) Notice: Subject to any disclaimer, the term of this patent is extended or adjusted under 35 U.S.C. 154(b) by 375 days.

(21) Appl. No.: 12/643,914

(22) Filed: Dec. 21, 2009

(65) Prior Publication Data

US 2011/0149251 A1 Jun. 23, 2011

(51) Int. Cl.
*G03B 21/14* (2006.01)
*G03H 1/12* (2006.01)
*H01S 5/00* (2006.01)
*H01S 3/08* (2006.01)
*H01S 3/13* (2006.01)

(52) U.S. Cl. ........... 353/38; 353/97; 359/11; 359/27; 372/29.014; 372/38.02; 372/50.11; 372/50.12; 372/103

(58) Field of Classification Search ............... 353/38, 353/97; 359/11, 27, 279, 207.7, 217.4; 372/29.014, 372/38.02, 50.11, 50.12, 103
See application file for complete search history.

(56) References Cited

U.S. PATENT DOCUMENTS

| 2007/0097335 | A1* | 5/2007 | Dvorkis et al. ............... 353/94 |
| 2008/0158513 | A1 | 7/2008 | Bartlett et al. |
| 2008/0212034 | A1 | 9/2008 | Aksyuk et al. |
| 2009/0034041 | A1 | 2/2009 | Grasser |
| 2009/0257106 | A1 | 10/2009 | Tan et al. |

FOREIGN PATENT DOCUMENTS

JP 2005-241674 9/2005

OTHER PUBLICATIONS

Dingel, Benjamin et al., "Speckle-Free Image in a Laser Diode Microscope by Using the Optical Feedback Effect", *Optical Letters*, vol. 18, No. 7 Apr. 1, 1993, 549-551.
Jones, R. J. et al., "Influence on External Cavity Length on the Coherence Collapse Regime in Laser Diodes Subject to Optical Feedback", *IEE Proc-Optoelectron*, vol. 148, No. 1 Feb. 1, 2001, 7-12.

(Continued)

*Primary Examiner* — Georgia Y Epps
*Assistant Examiner* — Magda Cruz
(74) *Attorney, Agent, or Firm* — Kevin D. Wills

(57) ABSTRACT

A optical apparatus (201) for use in an laser imaging system (200) is provided. The optical apparatus (201) includes one or more optical elements (215) that are configured to create an intermediate image plane (217) in the laser imaging system (200). A diffractive optical element (216) is then disposed at the intermediate image plane (217) to reduce speckle. The diffractive optical element (216) includes a periodically repeating phase mask (218) that can be configured in accordance with steps, vortex functions, Hermite-Gaussian functions, and so forth. Smooth grey-level phase transitional surface (337) can be placed between elements (333,334) to improve brightness and image quality. The periodically repeating phase mask (218) makes manufacture simple by reducing alignment sensitivity, and can be used to make applicable safety standards easier to meet as well.

20 Claims, 12 Drawing Sheets

OTHER PUBLICATIONS

Trisnadi, Jahja I. et al., "Speckle Contrast Reduction in Laser Projection Displays", *SPIE* vol. 4657 Apr. 26, 2002.

Volker, A.C. et al., "Laser Speckle Imaging with an Active Noise Reduction Scheme", *Optics Express*, vol. 13, No. 24, Nov. 15, 2005. 9782-9787.

Woodward, S. L. et al., "The Onset of Coherence Collapse in DBR Lasers", *IEEE Photonics Technology Letters*, vol. 2, No. 6 Jun. 1, 1990, 391-394.

Microvision, Inc., , "International Search Report and Written Opinion", *ISR and Written Opinion for PCT/US2010/061298* Aug. 29, 2011.

\* cited by examiner

DIFFRACTIVE OPTICAL ELEMENT HAVING PERIODICALLY REPEATING PHASE MASK AND SYSTEM FOR REDUCING PERCEIVED SPECKLE

BACKGROUND

1. Technical Field

This invention relates generally to a diffractive optical element in an image projection system to reduce speckle, and more particularly to a diffractive optical element having a periodically repeating phase mask that is positioned along an intermediate image plane of an image projection system to reduce speckle.

2. Background Art

Modern projection systems, such as laser-based projection systems, facilitate the production of brilliant images created with vibrant colors. The image quality associated with both laser-based and other types of projection systems is continually being improved with advances in technology. Projection systems are becoming smaller and more compact, with some systems being small enough to fit easily into a portable electronic device such as a mobile telephone. Additionally, the power required to produce brilliant images is continually decreasing. Projection systems are becoming less expensive to manufacture as well.

One practical drawback associated with some projection systems is an image artifact known as "speckle." Speckle occurs when a coherent light source is projected onto a randomly diffusing surface. As lasers generate coherent light, speckle can be prevalent in laser-based systems. However, the problem is not limited to scanned-laser-based systems, as it can also appear in conjunction with laser illumination used in digital light projection systems and liquid crystal on silicon systems as well.

When a coherent light source is used, components of the light combine with other components when the light reflects off a rough surface. This combining works to form patches of higher intensity light and lower intensity light due to the resulting constructive and deconstructive interference. In an image detector with a finite aperture, such as a human eye, these varied patches of intensity appear as optical "speckles," as some small portions of the image look brighter than other small portions. Further, this spot-to-spot intensity difference can vary depending on observer's position, which makes the speckles appear to change when the observer moves.

Turning now to FIG. 1, illustrated therein is a prior art system 100 in which an observer 102 may perceive speckle. Specifically, a coherent light source 101, which for discussion purposes will be a laser, delivers a coherent beam 104 to a modulation device 103. The modulation device 103 modulates the coherent beam 104 into a modulated coherent beam 105 to form an image on a projection medium, such as the projection screen 107 shown in FIG. 1.

As the projection screen 107 surface has a random roughness, i.e., as it includes tiny bumps and crevices that are randomly distributed, the reflected light 108 has portions that combine and portions that cancel. As a result, the observer 102 views an image 106 that appears to be speckled. The presence of speckle often tends to perceptibly degrade the quality of the image produced using the laser projection system.

There is thus a need for an improved speckle-reducing system for use with image projection systems.

Figure 1:
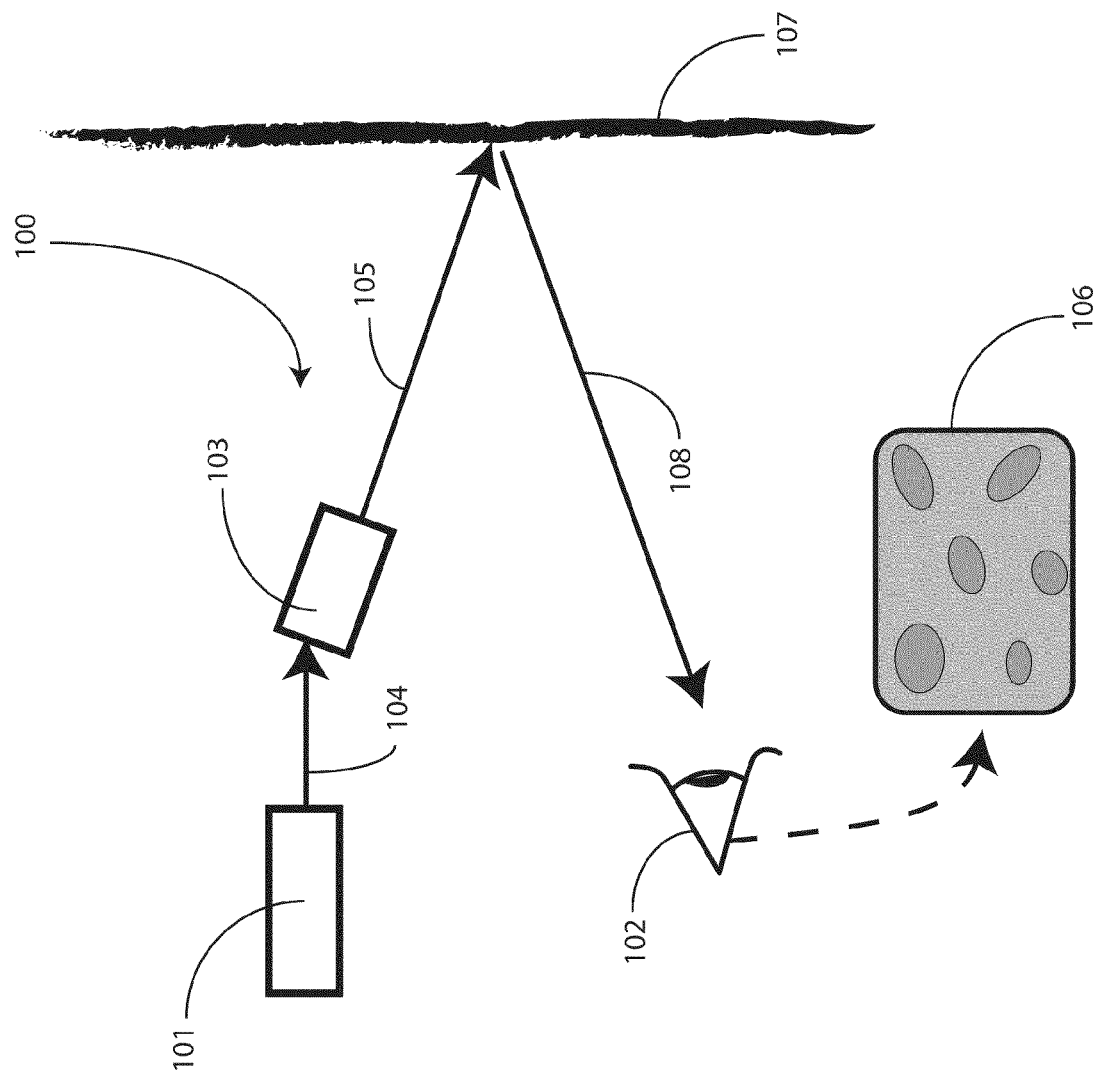
FIG. 1 illustrates a prior art image projection system exhibiting speckle characteristics.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to speckle reduction using passive, static, two-dimensional diffractive optical elements comprising periodically repeating phase masks. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of projecting images and reducing speckle as described herein. The non-processor circuits may include, but are not limited to, microprocessors with software configured to control the microprocessors to receive image data and project images on a display surface, scanning mirrors, drivers, image modulation devices, memory devices, clock circuits, power circuits, and so forth. As such, these functions may be interpreted as steps of a method to produce images or perform speckle reduction. Alternatively, some or all functions could be implemented by a state machine that has no stored program instructions, or in one or more application specific integrated circuits, in which each function or some combinations of certain of the functions are implemented as custom logic. Of course, a combination of the two approaches could be used. It is expected that one of ordinary skill, notwithstanding possibly significant effort and many design choices motivated by, for example, available time, current technology, and economic considerations, when guided by the concepts and principles disclosed herein will be readily capable of generating such programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the invention provide a device for reducing speckle in image projection systems. In one embodiment, a two-dimensional diffractive optical element is placed at a focal point or image plane of an image projection system. One or more optical elements can be included to create a replicated image plane between a light source and a light modulator. This replicated image plane, referred to herein as an "intermediate image plane," can be created by telescoping lenses or parabolic reflectors. The static, passive, diffractive element introduces phase modulation in the intermediate image plane to change the beam profile to reduce speckle. In one embodiment, the diffractive optical element can alter the intensity pattern of the received light beam to both reduce speckle and to "even" the intensity pattern to increase the overall safety of the system.

Embodiments of the present invention offer many advantages over prior art systems. For example, many prior art solutions required that intermediate optical elements needed to be changed in time. This was generally accomplished by rotating or translating any intermediate optical elements. By contrast, embodiments of the present invention provide a static device that remains a constant physical relationship with both the light source and light modulator, thereby increasing reliability.

Next, prior art speckle reducing elements had to be precisely aligned with the incoming light beam. In very compact projection systems, such as scanned laser displays, this could make manufacturing such systems cost prohibitive. Embodiments of the present invention employ a periodically repeating phase mask that eliminates alignment sensitivity, thereby reducing cost associated with manufacture.

Figure 2:
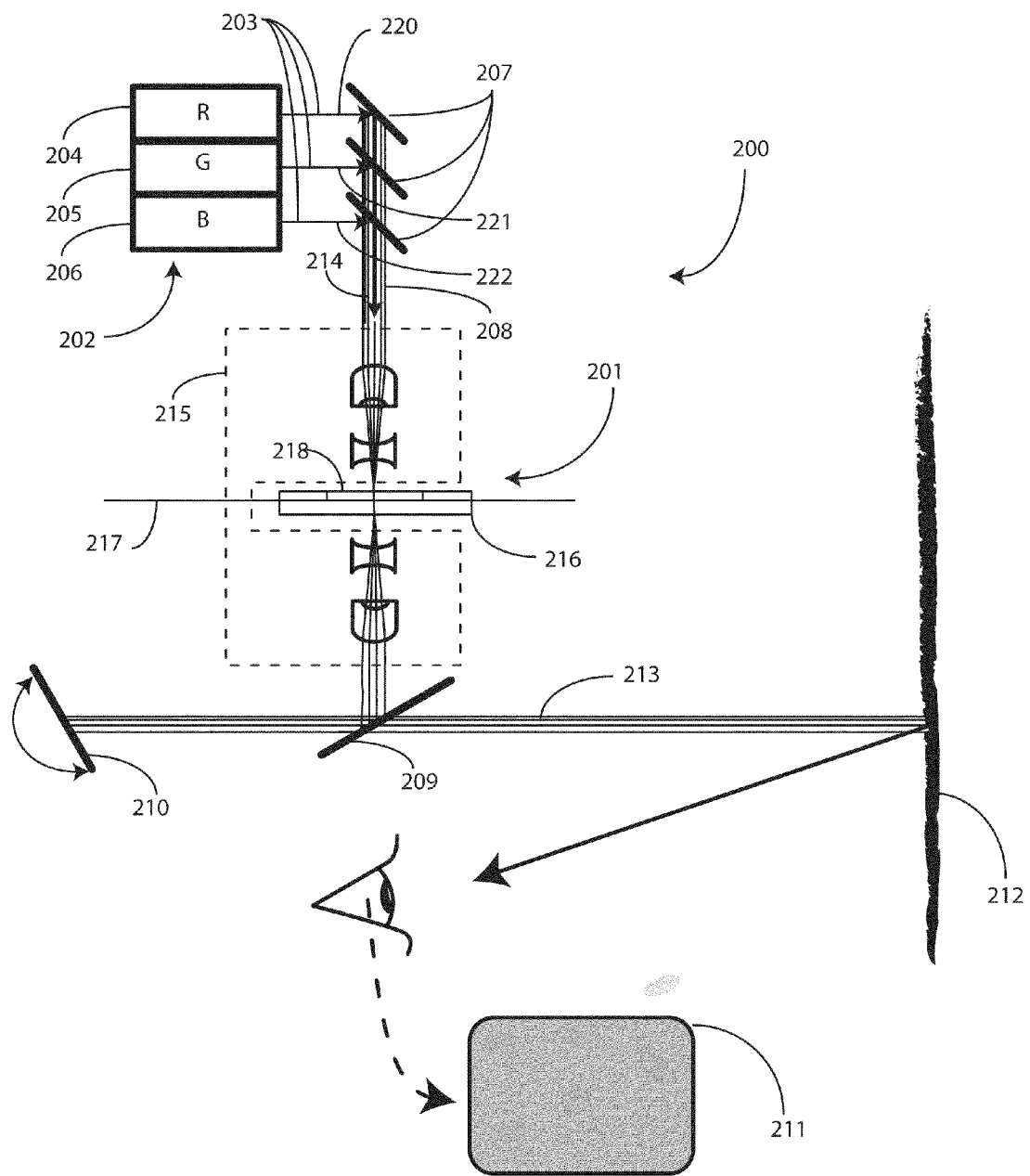
FIG. 2 illustrates one speckle reduction apparatus and system in accordance with embodiments of the invention.

Turning now to FIG. 2, illustrated therein is one laser imaging system 200 employing an optical apparatus 201 configured to reduce perceived speckle in images produced by the laser imaging system 200 in accordance with embodiments of the invention.

In FIG. 2, one or more laser sources 202 are configured to produce a plurality of light beams 203. In one embodiment, the one or more laser sources 202 comprise a red laser 204, a blue laser 206, and a green laser 205, as indicated by the "R," "G," and "B" in the illustrative embodiment of FIG. 2. These lasers can be any of a number of types of lasers. For example, in one embodiment, the one or more laser sources 202 comprise edge-emitting lasers. In another embodiment, the one or more laser sources 202 comprise vertical cavity surface emitting lasers. Such semiconductor lasers are well known in the art and are commonly available from a variety of manufacturers.

To facilitate freedom of design, i.e., to permit the designer to orient the one or more laser sources 202 in different ways within the laser imaging system 200, one or more optical alignment devices 207 can be used to direct light beams 203 from the one or more laser sources 202. Optical alignment devices 207 can be used for light redirection, for example, to permit the designer to "pack" the various components of the laser imaging system into a more compact form factor. Optical alignment devices 207 can be used to create long optical path lengths in relatively small devices.

In one embodiment, the one or more optical alignment devices 207 are used to orient the plurality of light beams 203 into a single, combined light beam 208. Where the one or more laser sources 202 comprise a red laser 204, blue laser 206, and green laser 205, the one or more optical alignment devices 207 can blend the output of each laser to form a collinear beam of white light. As described above, coherent light from a laser projection source can result in perceived speckle when this light reflects off a random scattering surface to a receiver. The optical apparatus 201 of embodiments of the present invention work to reduce this perceived speckle by introducing a phase mask along the optical axis by creating an interference pattern within the coherent beam. The interference pattern results in reflected light that includes less perceived speckle due to the fact that the constructive and destructive combinations of reflected light rays are reduced.

In one embodiment, dichroic mirrors are used as the one or more optical alignment devices 207. The dichroic mirrors are used to orient the plurality of light beams 203 into the combined light beam 208. Dichroic mirrors are partially reflective mirrors that include dichroic filters that selectively pass light in a narrow wavelength bandwidth while reflecting others. In one embodiment, polarizing coatings can be incorporated into the dichroic mirrors where the combined light beam 208 is linear polarized. Note that the location, as well as the number, of the optical alignment devices 207 can vary based upon application. Alternatively, some applications may not require optical alignment devices 207.

A light modulator 210 is then configured to produce images 211 by modulating the combined light beam 208 and delivering it to a display surface 212. In the illustrative embodiment of FIG. 2, the combined light beam first reflects off a dichroic mirror 209 to be directed to the light modulator 210. The modulated light 213 then passes through this dichroic mirror 209 en route to the projection surface 212. Note that the use of this dichroic mirror 209 is optional, in that the combined light beam 208 can be delivered to the light modulator 210 directly as well.

In one embodiment, the light modulator 210 comprises a MEMS scanning mirror. Examples of MEMS scanning mirrors, such as those suitable for use with embodiments of the present invention, are set forth in commonly assigned, copending U.S. patent application Ser. No. 11/775,511, filed Jul. 10, 2007, entitled "Substrate-Guided Relays for Use with Scanned Beam Light Sources," which is incorporated herein by reference, and in US Pub. Pat. Appln. No. 2007/0159673, entitled, "Substrate-guided Display with Improved Image Quality," which is incorporated herein by reference.

The optical apparatus 201 configured to reduce perceived speckle is disposed along an optical path 214 of the combined light beam 208. In one embodiment, the optical apparatus 201 includes one or more optical elements 215 and a static, two-dimensional diffractive optical element 216. The one or more optical elements 215 can take a variety of forms, as will be shown below, including telescoping optics, off-axis devices, off-axis devices using parabolic reflectors, collimator relays, and so forth. The static, two-dimensional diffractive optical element 216, in one embodiment, comprises a periodically repeating phase mask 218. As with the one or more optical elements 215, a single period of the periodically repeating phase mask 218 can take a variety of forms as will be shown below. Examples include quadrant patterned phase masks, vortex phase function masks, hexagonal patterned phase masks, and Hermite-Gaussian phase function masks.

Each periodically repeating phase mask 218, as the name suggests, comprises a plurality of phase masks that are repeated periodically in accordance with beam size. Periodically repeated phase masks are an exemplary embodiment that will be used herein for discussion purposes. It will be clear to those of ordinary skill in the art having the benefit of this disclosure, however, that embodiments of the invention are not so limited. For this reason, in some of the descriptions below, the phase mask components that comprise the periodically repeating phase masks will be referred to as "unit cells." The structural features that are used to construct each mask, i.e., the mask elements, can accordingly be referred to as "subcell elements." This nomenclature demonstrates that while periodically repeating phase masks comprising individual phase masks having mask elements can be used in one embodiment, other optical structures can be substituted for the mask subcell elements described herein, and can be repeated in a periodically arranged way to form a unit cell, to reduce speckle as described herein.

The one or more optical elements 215 are configured to create an intermediate image plane 217 with light received from the laser sources 202. The creation of an intermediate image plane 217 that is located between the laser sources 202 and the light modulator allows the static, two-dimensional diffractive optical element 216 to be disposed at a focal point of the combined light beam 208 that is located within the laser imaging system 200.

The static, two-dimensional diffractive optical element 216 offers advantages over prior art solutions attempting to reduce perceived speckle. For example, in prior art systems where phase pattern devices were employed in the image plane, the phase pattern was either only applied in one dimension, i.e., the scanning direction of the combined light beam 208, or required a temporal change in the phase mask, which was generally accomplished by rotation, translation or by changing the electrical addressing applied to a spatial light modulator. Embodiments of the present invention have neither of these limitations.

Figure 14:
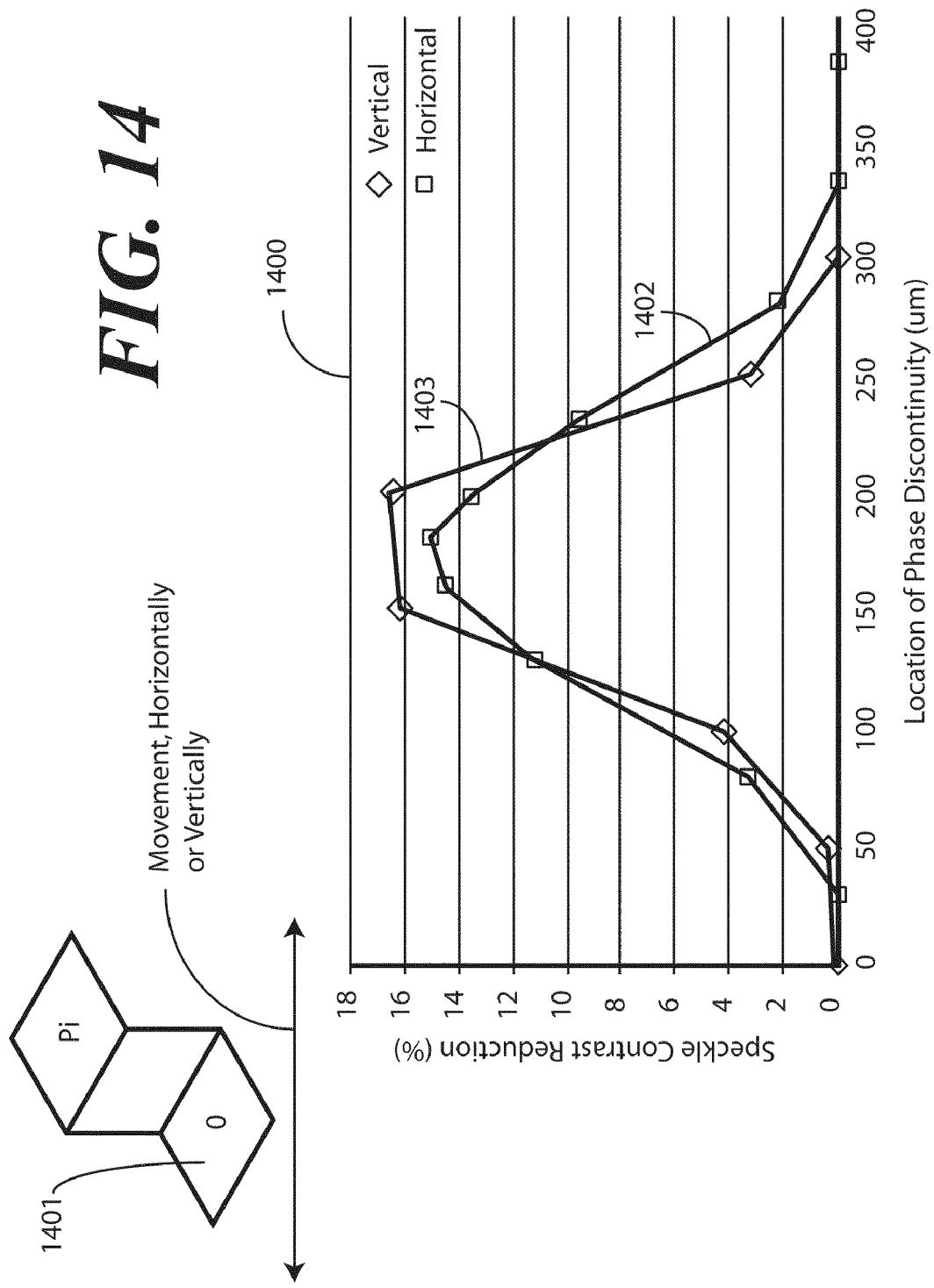
FIG. 14 illustrates speckle contrast ratio reduction for one exemplary system in accordance with embodiments of the invention.

Next, embodiments of the present invention make the manufacture of low-speckle laser imaging systems 200 simpler and more cost effective. As will be appreciated by those of ordinary skill in the art, the use of phase mask elements in coherent-light systems, such as scanned laser-based systems, generally requires alignment of the phase mask within a fraction of the beam diameter. This can be expensive or nearly impossible, as the beam diameter in some laser-based systems can be on the order of a few tens of microns. Even where alignment is achieved, field use can result in movement, as physical and thermal stress can affect the alignment of components. Embodiments of the present invention employ the periodically repeated phase mask 218 to eliminate the alignment sensitivity. Where the pattern area of the periodically repeated phase mask 218 is greater in size than the beam diameter at the intermediate image plane 217, even if the static, two-dimensional diffractive optical element 216 moves, portions of the beam will pass through an initially aligned phase mask while other portions will pass through adjacent, replicated phase patterns. As a result, speckle reduction will be maintained without the need of precision initial or continuous alignment. FIG. 14 will illustrate this more graphically below.

The static, two-dimensional diffractive optical element 216 is also a passive device. No external power, motors, light sources, or image correction software is required to achieve speckle reductions. In one embodiment, the static, two-dimensional diffractive optical element 216 is simply a layer of isotropic material, such as glass, having the periodically repeating phase mask 218 etched thereon. Thus, the overall cost of a laser imaging system 200 employing the optical apparatus 201 is not significantly affected when compared to prior art imaging systems.

One other advantage offered by embodiments of the present invention involves beam intensity in the image as it relates to safety. As designers of laser-based projection systems will appreciate, applicable safety standards set limits on the amount of energy delivered by a projection system, as well as the properties associated with the beam that is produced by the projection system. When employing a static, two-dimensional diffractive optical element 216 in accordance with embodiments of the invention, the introduced phase modulation changes the beam profile at the light modulator 210.

In one embodiment, the periodically repeating phase mask 218 can be designed such that the beam intensity at the light modulator 210 increases the $C_6$ value associated with the beam, thereby increasing the laser safety margin relative to a standard while concurrently reducing perceived speckle. (As is known to those of ordinary skill in the art, the $C_6$ value is set forth in IEC safety standards relating to laser imaging.) Both simulation and experimental testing have shown that the $C_6$ value can be increased by at least twenty-percent. For example, in a green laser beam, a typical $C_6$ value may be 4. However, using a quad mask element in a periodically repeating pattern, the $C_6$ value can be increased to 5.5. The net result is that applicable safety standards are more easily met with such a system which also offers better image quality through reduced perceived speckle by changing the energy profile in a way that reduces the maximum possible power density delivered by the system under worst case experimental scenarios.

In the embodiment of FIG. 2, there is one static, two-dimensional diffractive optical element 216 for the combined light beam 208. It will be clear to those of ordinary skill in the art having the benefit of this disclosure that embodiments of the invention are not so limited. Rather than including a single static, two-dimensional diffractive optical element 216 for the combined light beam 208, multiple static, two-dimensional diffractive optical elements could be used with each laser source 202. For example, one static, two-dimensional diffractive optical element could be used with the red laser 204 at location 220, another with the blue laser 206 at location 222, and another with the green laser 205 at location 221. In some systems, a single static, two-dimensional diffractive optical element can be used, but not with the combined light beam 208. For example, if the red laser 204 contributes substantially more to speckle than the other laser sources, the single static, two-dimensional diffractive optical element can be used with the red laser only. Further, each static, two-dimensional diffractive optical element can include a periodically repeating phase mask that is tuned to its corresponding source. Further, when used with single laser sources, the various periodically repeating phase masks can be tuned to further increase the $C_{.sub.6}$ value, thereby making it easier to meet applicable safety standards while maintaining image quality and reducing speckle.

Figure 3:
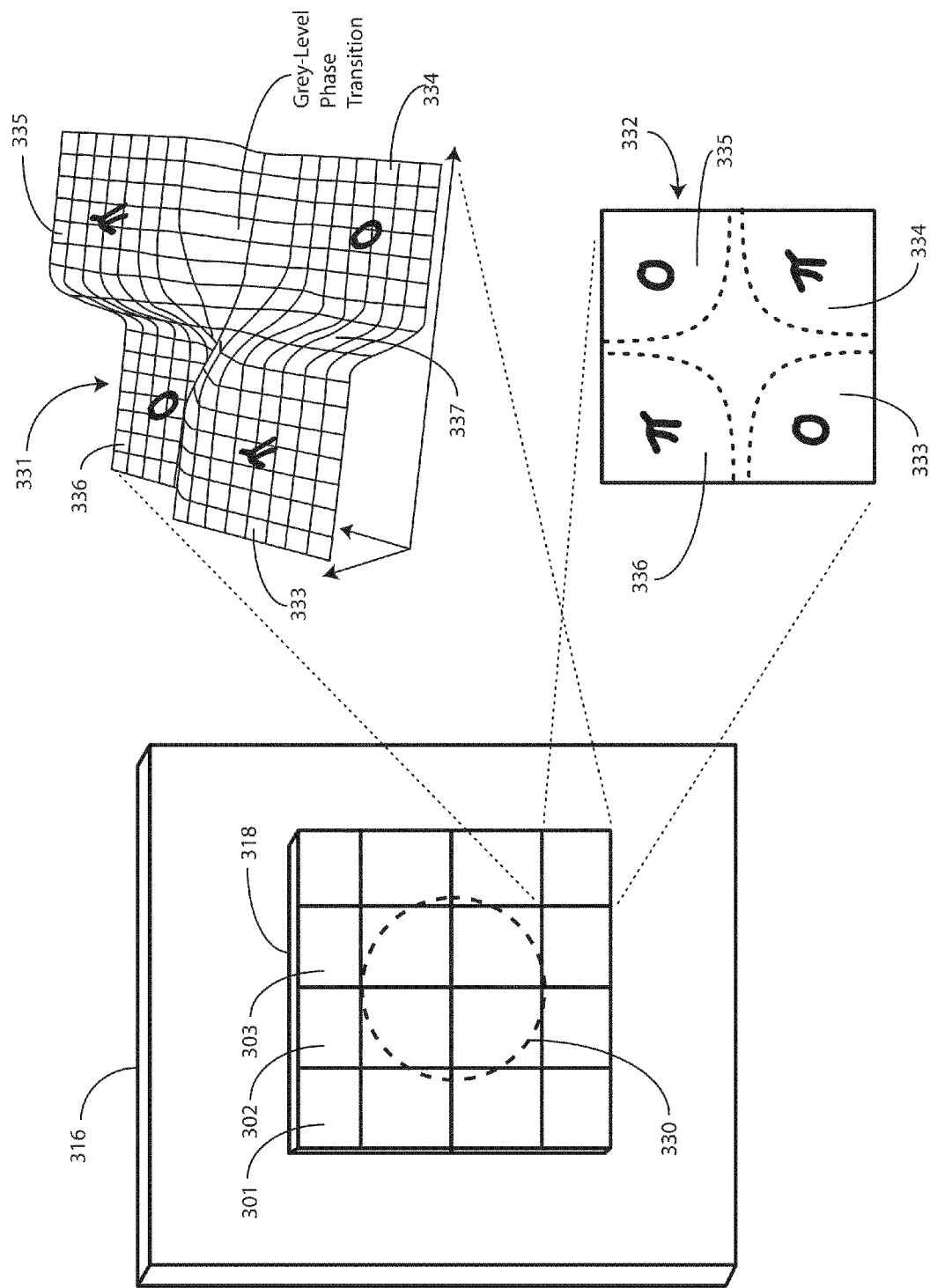
FIG. 3 illustrates one embodiment of a diffractive optical element in accordance with embodiments of the invention.

Turning now to FIG. 3, illustrated therein is one embodiment of a diffractive optical element 316 in accordance with embodiments of the invention. As noted above, in one embodiment, the diffractive optical element 316 is manufactured from an isotropic material, such as glass. The diffractive optical element 316 of FIG. 3 includes a periodically repeating phase mask 318 disposed thereon. In one embodiment, the periodically repeating phase mask 318 can be manufactured by etching the material comprising the diffractive optical element 316.

Each phase mask, e.g., unit cells 301,302,303, of the periodically repeating phase mask 318 is repeated with a period of repetition that is proportional with the beam size 330 received by the diffractive optical element 316 at the intermediate image plane (217). In the illustrative embodiment of FIG. 3, each phase mask is symmetrically repeated such that the pattern area resulting from the total number of phase masks is greater than the beam size 330. Said differently, the periodically repeated phase mask 318 is disposed along a pattern area that exceeds the beam size 330 of the one or more light beams (203) at the intermediate image plane (217).

View 331 in FIG. 3 shows an exemplary unit cell 303 in perspective view. View 332 shows exemplary unit cell 303 in plan view. In the illustrative embodiment of FIG. 3, each phase mask has been configured as a combination of vertical and horizontal phase jumps, hence the "two-dimensional" nature of the diffractive optical element 316. For discussion purposes, the exemplary unit cell 303 is configured as a "quad" phase mask in that the phase mask comprises four alternating subcell elements 333,334,335,336. It will be clear to those of ordinary skill in the art having the benefit of this disclosure that the invention is not so limited. Where alternating mask or subcell elements are used for example, the number of "jumps," i.e., the number of subcell elements having different properties, within a unit cell of the structure can vary. This number could be any integer value two, three, four, and so forth, that can be periodically repeated.

In the illustrative embodiment of FIG. 3, each subcell element 333,334,335,336 alternates between elements that differ by Pi radians. For example, two subcell elements, i.e., subcell element 333 and subcell element 335, have zero phase modulation. Two other subcell elements, subcell element 334 and subcell element 336, introduce Pi phase modulation. This can be seen textually in view 332, and graphically in view 331. As with the number of subcell elements, the amount of phase modulation can vary. Alternating between zero and Pi phase modulation will be used as one example for discussion purposes. Note that the design value of Pi radians is achieved at a single wavelength when the diffractive optical element is a surface relief element. Where the combined beam comprises multiple wavelengths, each wavelength experiences a slightly different phase delay in the diffractive optical element.

In one embodiment, each subcell element 333,334,335, 336 is separated from each adjacent element by a transitional surface that is defined by a continuous function. For example, subcell element 333 is separated from subcell element 334 by a transitional surface 337 that can be defined by a continuous function. Said differently, when viewed in cross section, the transitional surface 337 is smooth as it runs between each element, and does not include angles or steps. Said differently, the transitional surface makes a gradual transition between the peak values of adjacent elements elements. The inclusion of such a transitional surface may be counterintuitive at first, as the use of a smooth surface between subcell elements 333,334,335,336 actually reduces the amount of speckle reduction that can be achieved. However, some embodiments of the present invention employ the smooth transitional surface, also referred to herein as a "grey-level phase transition surface," to increase the amount of light that passes through the projector system. Such embodiments provide reduced speckle, yet work to better maintain brightness and overall image integrity.

In manufacture, one way to achieve an approximation of a smooth or gradual transition is to include many small steps that flow between one subcell element and the next, as it is often easier to form orthogonal transitions in materials such as glass. Thus, in one embodiment, the transitional surface 337 can comprise many small step transitions that approximate a smooth or gradual transition as otherwise described herein. Note that this large number of small transitions differs from prior art solutions in that prior art solutions include only a single step to maximize light transmission, in that the small number of steps has reduced light transmission when compared to prior art solutions with better speckle reduction performance.

Figure 4:
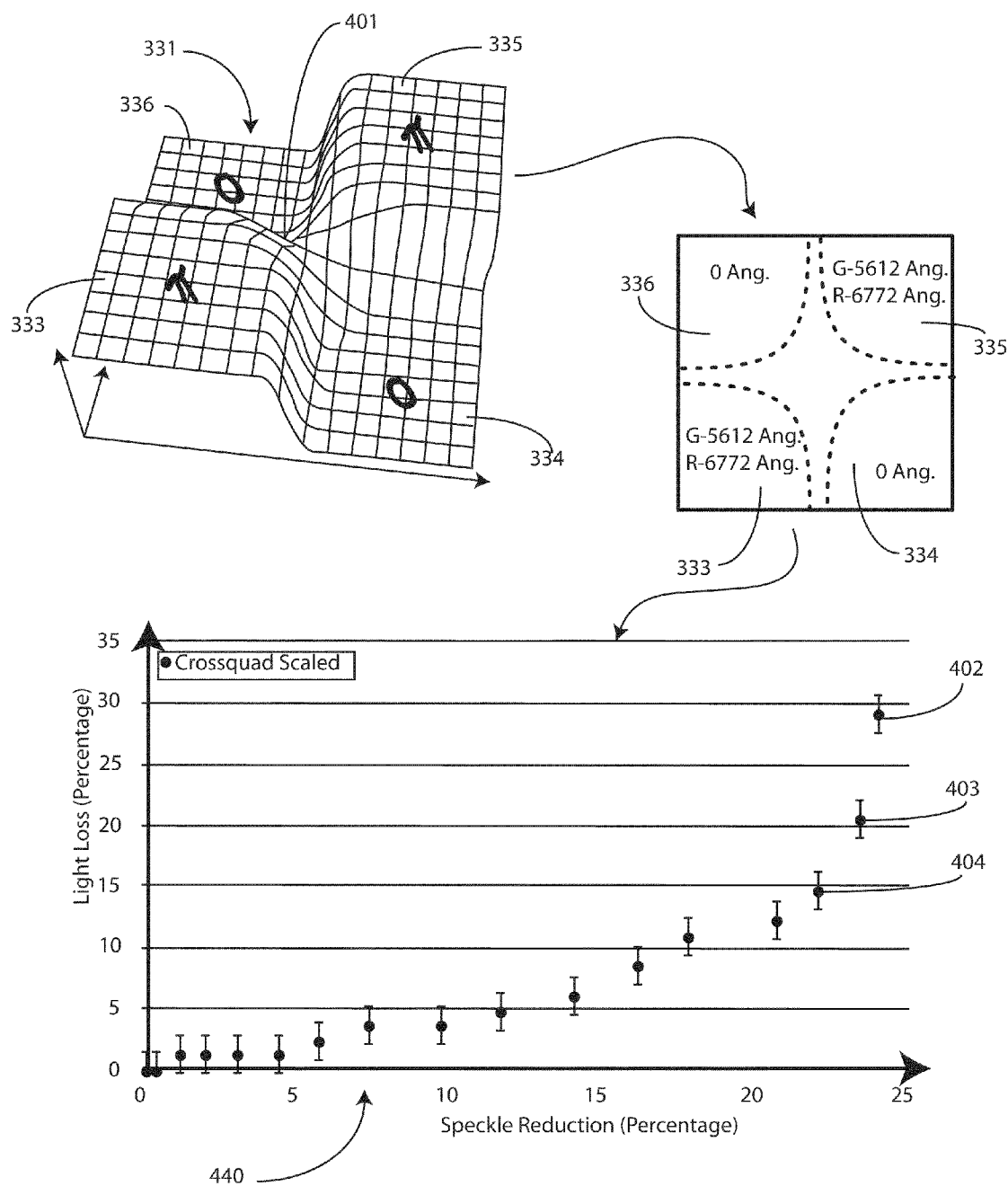
FIG. 4 illustrates a speckle reduction effect versus light loss in a diffractive optical element having smooth transitions between phase masks in accordance with embodiments of the invention.

Turning now to FIG. 4, this is illustrated graphically. View 331 is shown, with each subcell element 333,334,335,336 being separated by a grey-level phase transition surface. Further, connected but non-adjacent mask elements are also separated by a grey-level phase transition surface. For example, subcell element 333 is connected to, but not adjacent with, subcell element 335. As shown in FIG. 4, a mask saddle 401, which can be represented by a continuous function, separates these subcell elements 333,335.

Graph 440 illustrates experimentally modeled results for various periodically repeating phase mask elements. Marker 402 illustrates a diffractive optical element in which the elements make an abrupt transition with a single step in a non-continuous way. Said differently, for marker 402, the elements transition to each other at right angles with vertical walls, with a single step, and do not employ grey-level phase transitions that are either smooth or that incorporate small steps approximating a smooth surface. By contrast, markers 403 and 404, as well as all markers to the left thereof, employ grey-level phase transitions between mask elements, which can be formed as either smooth surfaces or by incorporating many different orthogonal steps that approximate a smooth surface. Moving to the left from marker 403 in Graph 440 reveals phase mask designs employing smoother, and therefore wider, grey-level phase transitions.

As shown in Graph 440, masks employing non-continuous, single step, discrete transitions offer more speckle reduction than do those using grey-level phase transitions. However, masks using non-continuous transitions between elements also have the highest light loss. This is because the sharp edges between elements have stronger higher diffraction orders that lead to light loss at the limiting aperture. To balance light loss with speckle reduction, in one embodiment, the sharp edges are rounded to yield grey-level phase transitions between mask elements. This is done to provide reduced loss of light while offering suitable speckle reduction.

Figure 5:
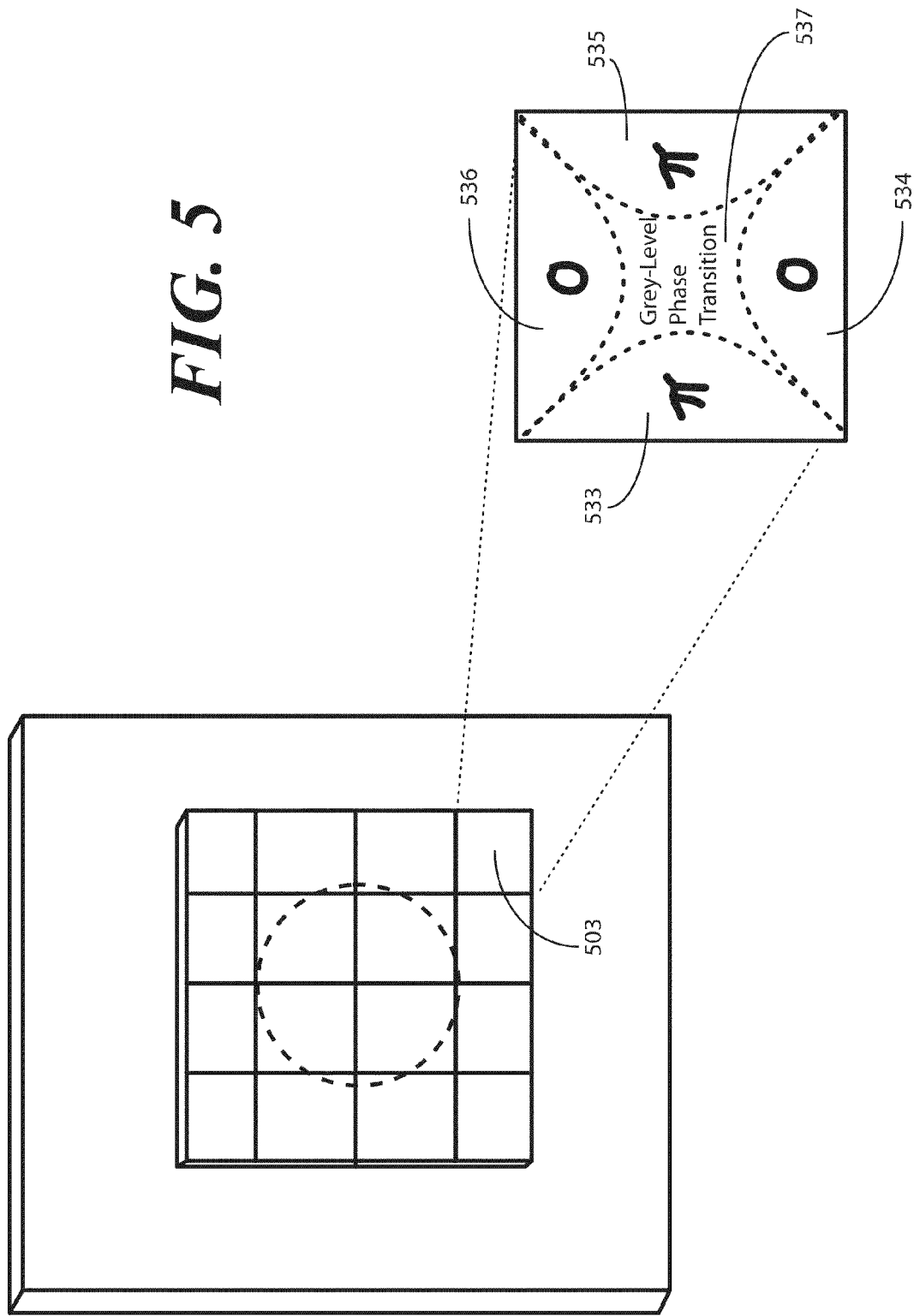
FIG. 5 illustrates another embodiment of a diffractive optical element in accordance with embodiments of the invention.

While the illustrative subcell elements 333,334,335,336 of each unit cell 303 in FIGS. 3 and 4 are shown as being located in quadrants when the unit cell 303 is viewed from above, it will be clear to those of ordinary skill in the art having the benefit of this disclosure that embodiments of the invention are not so limited. Phase modulation elements could be arranged in any number of ways. Turning now to FIG. 5, illustrated therein is one exemplary alternative embodiment.

In FIG. 5, rather than being arranged in quadrants, the subcell elements 533,534,535,536 of each unit cell 503 are arranged with forty-five degree relationships when viewed from above. Experimental modeling has shown that the embodiment of FIG. 5 can offer more speckle reduction than the embodiment of FIGS. 3 and 4 in some applications. For example, while the embodiments of FIGS. 3 and 4 may offer speckle reduction of 23.9% in one application, the embodiment of FIG. 5 may offer 24.4% speckle reduction in the same application. In FIG. 5, each subcell element 533,534,535,536 is separated from another by a grey-level phase transition 537. This will reduce somewhat the amount of speckle reduction that can be achieved, but will result in an image with increased brightness as noted above.

Figure 6:
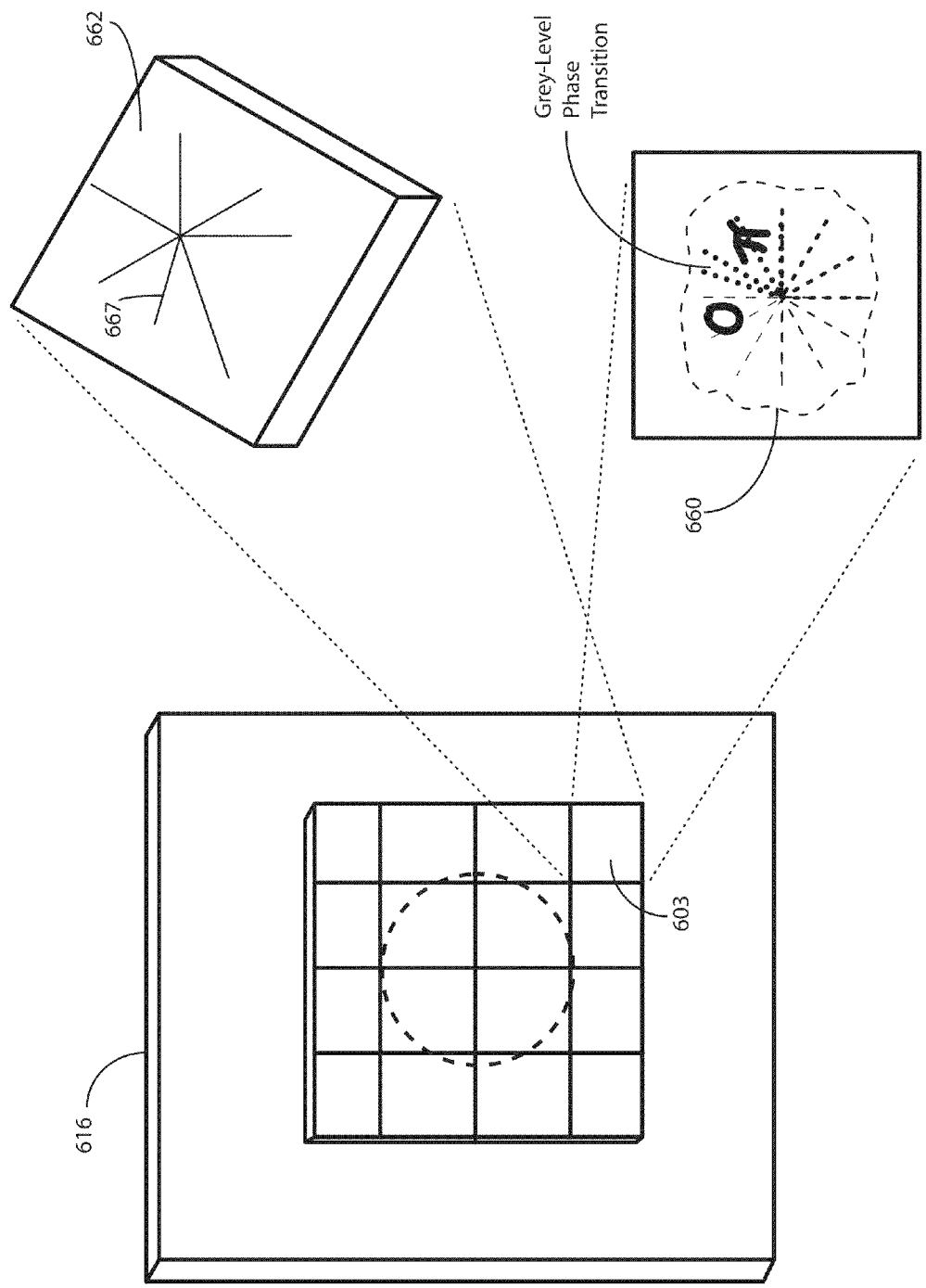
FIG. 6 illustrates another embodiment of a diffractive optical element in accordance with embodiments of the invention.

Turning now to FIG. 6, illustrated therein is a diffractive optical element 316 having unit cells, e.g., unit cell 603, employing a spatially varying pattern 660 that is a vortex-based variation. In the illustrative embodiment of FIG. 6, the spatially varying pattern 660 has been formed by a vortex-type surface relief 661 in a major face 662 of each unit cell 603. Each unit cell 603 is repeated to form the periodically repeating mask.

As shown in FIG. 6, the spatially varying pattern 660 is a first order vortex, as the thickness of the unit cell 603 varies with angle. For example, in FIG. 6 the vortex variation is configured such that thickness or phase modulation varies linearly with angle from zero to 2*Pi. Experimental simulation has shown that vortex type mask elements offer less speckle reduction than the embodiments of FIGS. 3-5. For instance, the speckle reduction associated with FIG. 6 may be on the order of 12-15%. However, this amount of speckle reduction will be adequate or even preferred in some applications, as transmitted brightness can be 92% of the received brightness.

Figure 7:
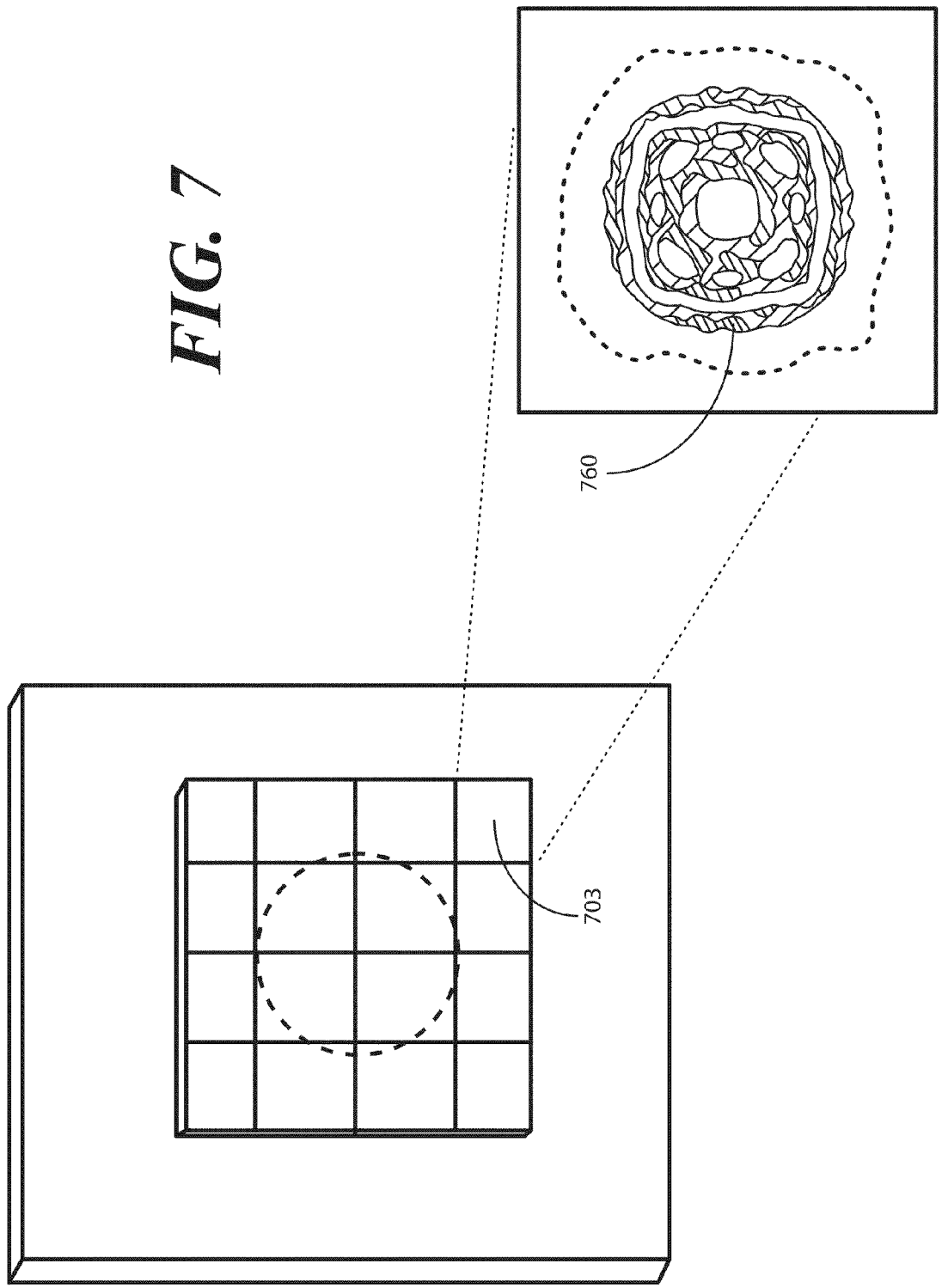
FIG. 7 illustrates another embodiment of a diffractive optical element in accordance with embodiments of the invention.

Turning now to FIG. 7, illustrated therein is another spatially varying pattern 760 that is well suited for use in a unit cell 703 for reducing speckle appearing in images that are displayed on a display surface from an image projection system. As with FIG. 6, the unit cell 703 of FIG. 7 comprises multiple subcell elements. The unit cell 703 is then repeated periodically to form the periodically repeated phase mask array. The spatially varying pattern 760 of FIG. 7 is referred to as a "Hermite-Gaussian" phase pattern because the spatially varying pattern 760 generates transmitted beams that are a close approximation to a Hermite-Gaussian mode in the far field.

As is known in the art, light propagating in a medium such as air has associated therewith an intensity profile. This intensity profile generally changes during propagation. For some configurations of the electric field associated with the light, which are known as modes, the amplitude profile remains fairly constant. For each beam, there is a family of Hermite-Gaussian modes that exist. These unit cells, e.g., unit cell 703, which are periodically repeated to form a mask array in FIG. 7, deliver transmitted beams that comprise approximations of these modes in the far field.

Figure 8:
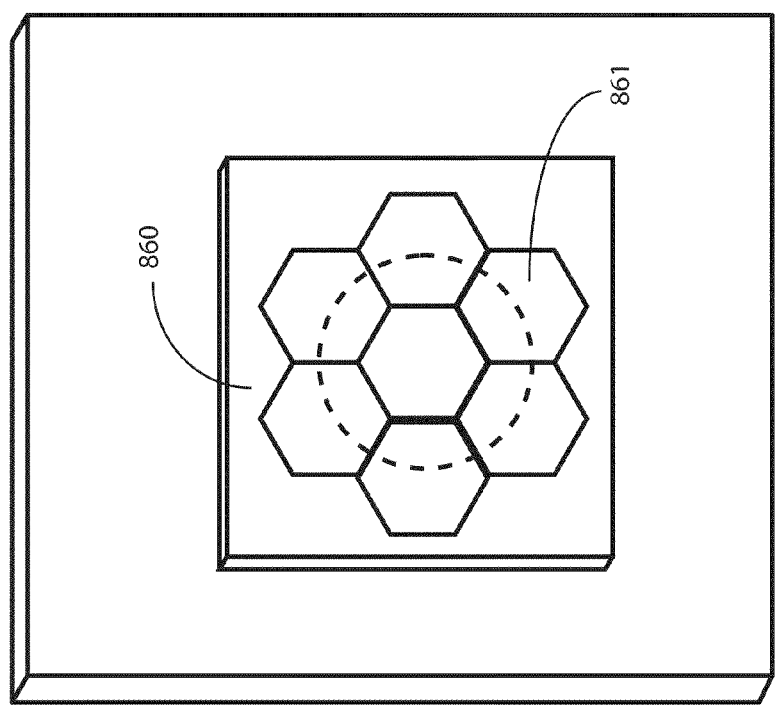
FIG. 8 illustrates another embodiment of a diffractive optical element in accordance with embodiments of the invention.

Turning now to FIG. 8, illustrated therein is another spatially varying pattern 860 that is well suited for use in a unit cell 803 for reducing speckle appearing in images that are displayed on a display surface from an image projection system. FIG. 8 shows that many different types of patterns can be used in accordance with embodiments of the invention. For example, the spatially varying pattern 860 of FIG. 8 is arranged hexagonally. FIG. 7 was arranged rectilinearly. The embodiment of FIG. 8 is presented to show that there are other periodically repeating arrangements—as compared to that shown in FIG. 7 for example—that can be used in accordance with embodiments of the invention to reduce speckle. Any of the various unit cells described herein, including the quadcells, vortex cells, Hermite-Gaussian cells, and so forth, can be arranged in a rectilinear array, a hexagonal array, circular array, and so forth. The unit cells 803 in FIG. 8 are drawn as hexagons, but may take other shapes as well.

Turning now to FIGS. 9-12, illustrated therein are various embodiments of the one or more optical elements (215) that can be used to create the intermediate image plane (217). These configurations are but a few of the various configurations that can be used with embodiments of the invention, and the invention is not intended to be limited in this regard.

Figure 9:
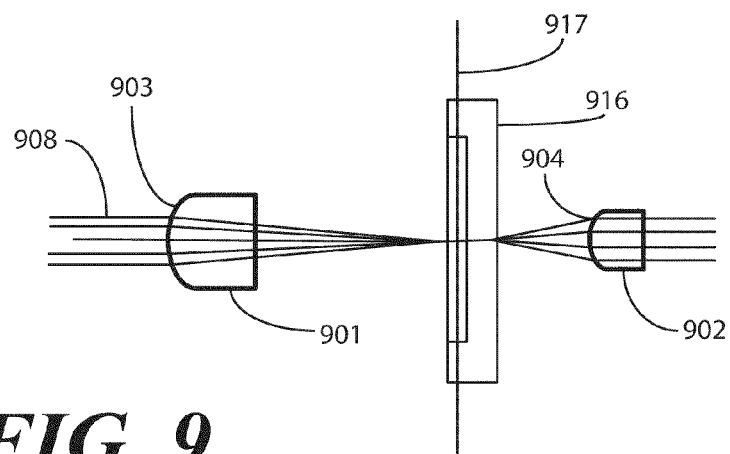
FIG. 9 illustrates one embodiment of an optical element configured to create an intermediate image plane in accordance with embodiments of the invention.

Beginning with FIG. 9, illustrated therein is a simple version of an optical telescope configuration employing two optical elements 901,902. A diffractive optical element 916 is disposed therebetween at the intermediate image plane 917 that is created. The first optical element 901 includes a convex face 903 having a focal length of 3 millimeters, while the second optical element 902 includes a convex face 904 having a focal length of 1.8 millimeters. The optical elements 901, 902 are disposed with their outer faces being separated by about 8 millimeters. When used in a laser-based system, the received beam 908 spot on the diffractive element 916 can be on the order of 4 micrometers in diameter. The configuration of FIG. 9 offers a very fast system with beam compression.

Figure 10:
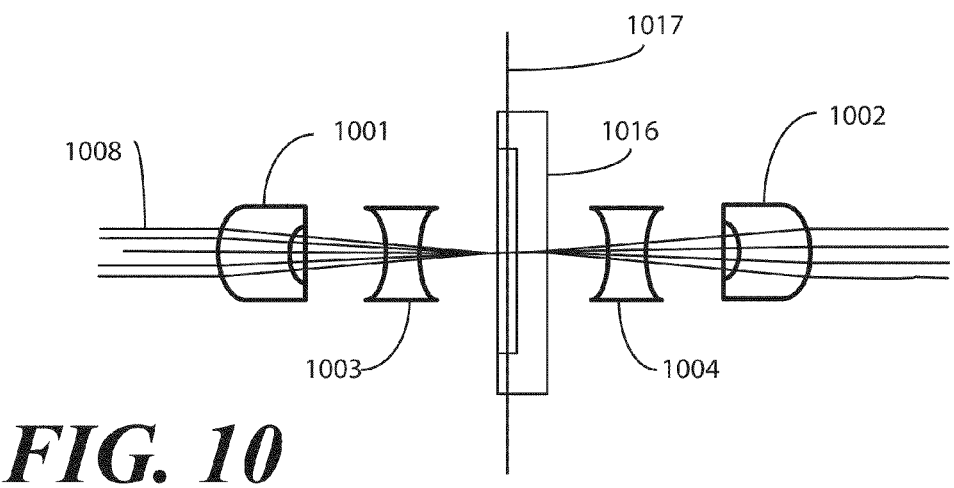
FIG. 10 illustrates another embodiment of an optical element configured to create an intermediate image plane in accordance with embodiments of the invention.

Turning now to FIG. 10, illustrated therein is another version of an optical telescope configuration employing four optical elements 1001,1002,1003,1004. A diffractive optical element 1016 is disposed therebetween at the intermediate image plane 1017 that is created by the optical elements 1001,1002,1003,1004. The optical elements 1001,1002 are disposed with their outer faces being separated by about 16 millimeters. When used in a laser-based system, the received beam 1008 spot on the diffractive element 1016 can be on the order of 25 micrometers in diameter. The configuration of FIG. 10 offers a very slow system with beam compression so no collimating devices are required.

Figure 11:
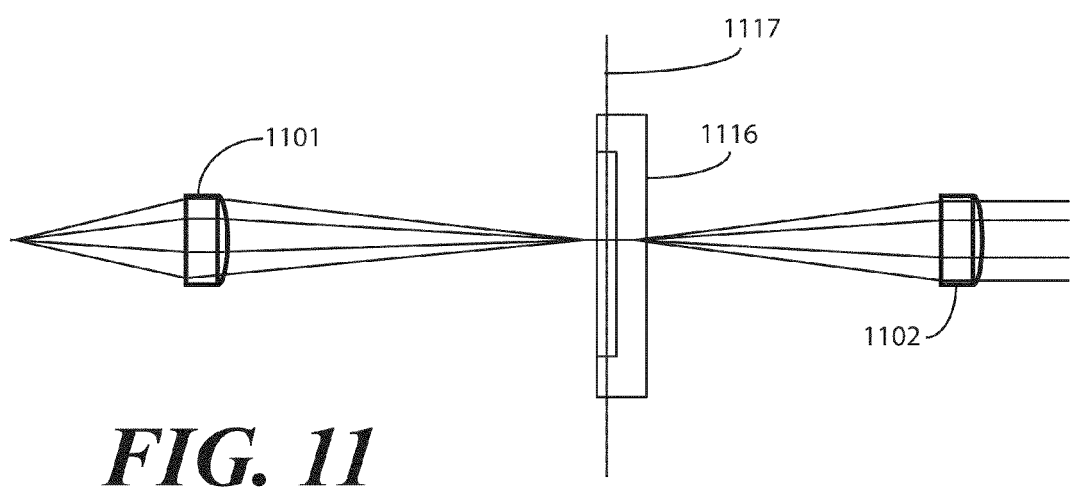
FIG. 11 illustrates another embodiment of an optical element configured to create an intermediate image plane in accordance with embodiments of the invention.

Turning now to FIG. 11, illustrated therein is an alternative design where a single optical element 1101 images the laser emission point onto the intermediate image plane 1117. This single optical element 1101 is then followed by a second optical element 1102, which creates a collimated or nearly collimated beam of light. Optical elements 1101 and 1102 are disposed roughly 19 mm apart. A diffractive optical element 1116 is disposed therebetween at the intermediate image plane 1117. The spot size at the intermediate image plane 1117 is about 14 micrometers.

Figures 12, 13:
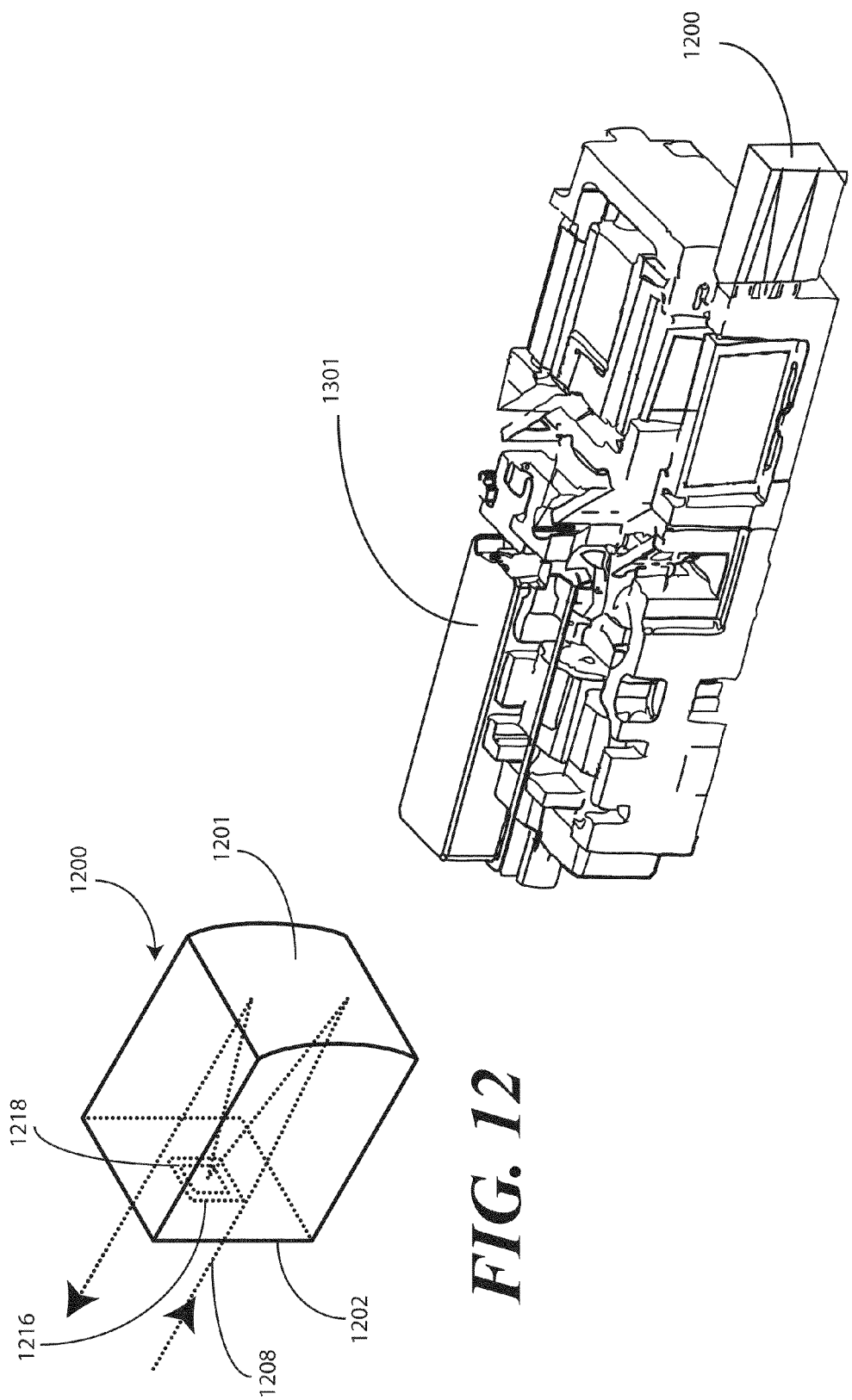
FIG. 12 illustrates another embodiment of an optical element configured to create an intermediate image plane in accordance with embodiments of the invention.
FIG. 13 illustrates one embodiment of an optical system incorporating an isotropic element comprising a parabolic reflector in accordance with embodiments of the invention.

Turning now to FIG. 12, illustrated therein is another embodiment of an optical element 1200 configured to create an intermediate image plane. The embodiment of FIG. 12 is an "off-axis element" in that the beam enters and exits the element along a path that does not pass through the focal point of the parabolic face 1201. An intermediate image plane is created at the focal point of the parabolic face 1201, which is shown as a curved reflective surface in FIG. 12. This off-axis optical element 1200 can be coupled to the side of an image projection system to perform speckle reduction within the optical element 1200. In the illustrative embodiment of FIG. 12, the optical element 1200 is an isotropic element made from glass.

As shown in FIG. 12, the optical element 1200 includes a parabolic face 1201 configured as a parabolic reflector. While a parabolic reflector is shown for illustrative purposes, it is well to note that other curved surfaces such as spherical surfaces or aspherical surfaces can also be used without departing from the spirit and scope of the invention.

A diffractive optical element 1216 is disposed adjacent to a major face 1202 at the focus and opposite the parabolic face 1201. Light beams 1208 enter the optical element 1200 through the major face 1202 and are reflected off the parabolic reflector to the diffractive optical element 1216 having the periodically repeating phase mask 1218 disposed thereon. The light is then directed back to the parabolic reflector. This can be done by a reflector disposed behind the diffractive optical element 1216, or by a reflective coating disposed on a side of the diffractive optical element 1216. The light is then directed out of the optical element 1200 through the major face 1202. FIG. 13 illustrates a scanned-laser display system 1301 employing the optical element 1200 to reduce perceived speckle.

Figure 15:
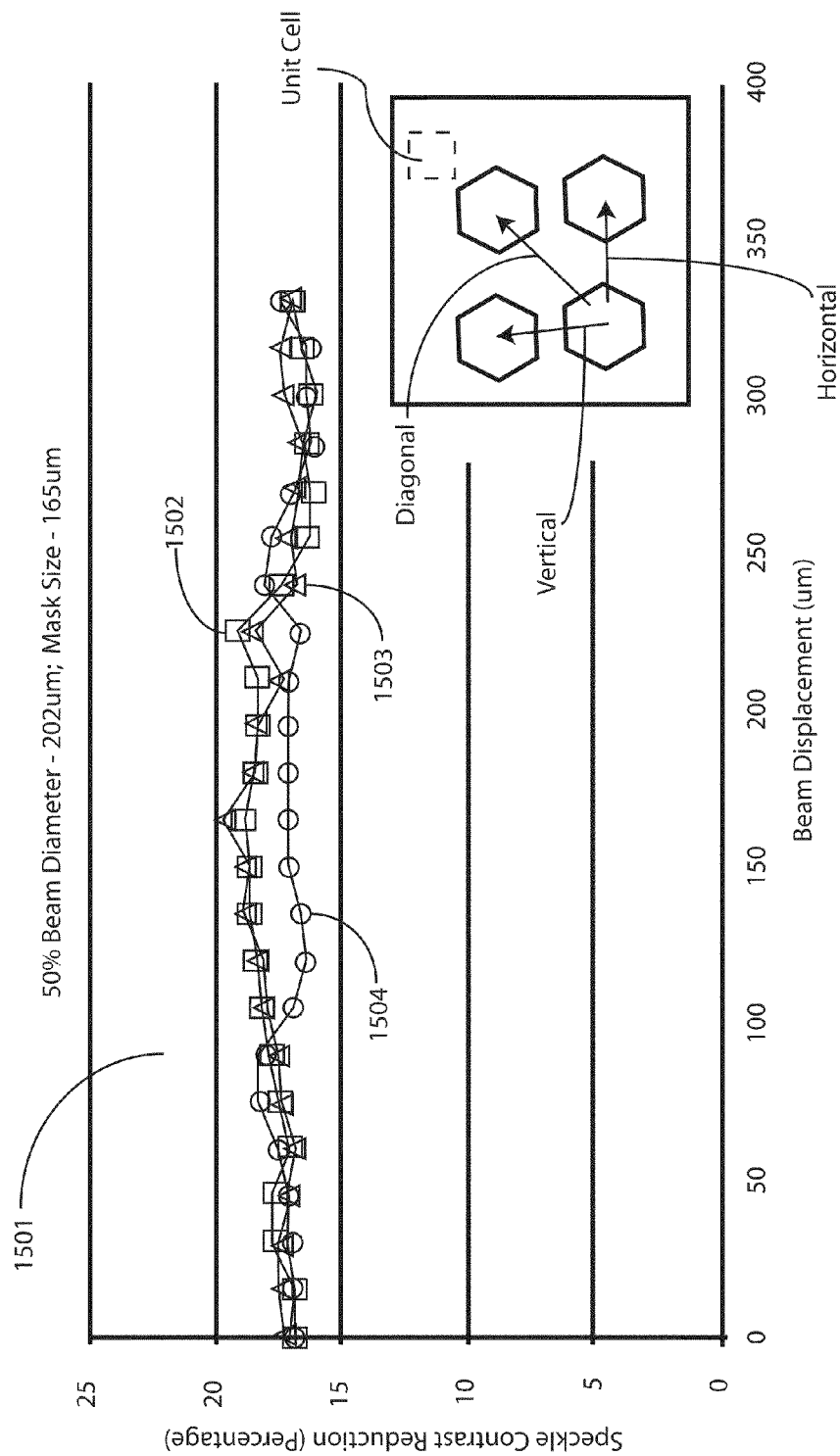
FIG. 15 illustrates a graph of alignment sensitivity corresponding to a diffractive optical element in accordance with embodiments of the invention.

As noted above, the use of a two-dimensional, periodically repeating phase pattern on the diffractive optical element helps to eliminate the alignment sensitivity that plagues prior art designs. Further, the diffractive optical element can be statically placed relative to the light sources with no need for temporal changes to reduce speckle. Turning now to FIGS. 14 and 15, these advantages will be investigated further.

Turning first to FIG. 14, illustrated therein is a graph 1400 depicting how speckle reduction changes with the position of a simple, one-dimensional phase mask 1401. Further, this one-dimensional phase mask does not include grey level transitions between mask elements. While embodiments of the present invention employ a two-dimensional periodically repeated phase mask that include grey-level transitions, the graph 1400 of FIG. 14 is still useful as a teaching tool. The a one-dimensional phase mask 1401 of FIG. 14 demonstrates that both horizontal and vertical orientations of the one-dimensional phase mask 1401 will deliver similar speckle reduction, even though some orientations cause discontinuity with respect to a horizontal scan direction and the other scan direction that is perpendicular thereto. Note that when a one-dimensional phase mask 1401 is shown in this figure, the amount of speckle reduction achieved can be dependent upon the alignment of the beam relative to the diffractive optical element and its unit cell.

As the one-dimensional phase mask 1401 is moved horizontally or vertically relative to the display axes within an impinging beam, speckle reduction as a function of the position is plotted on graph 1400. As shown, movement of the one-dimensional phase mask 1401 in the vertical direction 1402 and movement in the horizontal direction 1403 rises and falls, with a peak occurring when the discontinuity between mask elements is at the center of the impinging beam.

Turning now to FIG. 15, the speckle reduction versus beam position can be seen on a graph 1501. In this case, the underlying diffractive element begins with a unit cell that is two-dimensional, i.e., is one that has both horizontal and vertical phase variations and which is periodically replicated over an area much larger than the beam that is incident on the periodically repeated array of unit cells configured in accordance with embodiments of the invention.

In contrast with the one-dimensional phase mask (1401) of FIG. 14, the graph 1501 of FIG. 15 illustrates how periodic replication of the unit cell gives approximately constant speckle reduction that is independent of the position of the beam relative to the diffractive optical element. As indicated in the inset picture, the beam, which is approximately the same size as the unit cell, is moved in the vertical, horizontal, and diagonal directions relative to the periodically repeated unit cell array, and speckle reduction is graphed 1502,1503, 1504 for each new position. Unlike the previous case shown in FIG. 14 where there is just a single unit cell and speckle reduction is dependent upon alignment between the beam and the diffractive optical element in this case periodic replication of the unit cell results in speckle reduction that is nearly independent of the beam position on the diffractive optical element. The periodic repetition described herein in accordance with embodiments of the invention therefore offers advantages over prior art solutions in that it simplifies the manufacturing process associated with the projector engine by not requiring precision alignment of the diffractive optical element relative to the impinging beam. Further, embodiments of the invention reduce manufacturing costs and also result in a more robust projector design that is immune to beam drift that may occur over time and temperature.

In the test setup used in taking the measurements for graph 1501, the beam diameter was roughly 200 micrometers. Each mask of the periodically repeating phase mask was approximately 165 micrometers in diameter. However, the masks were repeated, with a period in proportion to the beam size, to form a mask area that was greater than the beam size. In such a configuration, the beam will always intersect more than one mask element. Accordingly, it does not matter exactly where within the periodically repeating phase mask the beam is aligned, but rather simply that the beam intersect the periodically repeating phase mask. As the periodically repeating phase mask can be made to any size, alignment becomes a simple operation in practice.

As shown here, embodiments of the present invention provide a two-dimensional static and passive diffractive optical element that includes a periodically repeating phase mask. When placed in an intermediate image plane in an image projection device, the diffractive optical element can be used to reduce speckle, mitigate image degradation, and more easily achieve applicable safety standards. Use of embodiments of the present invention are relatively simple to manufacture, as reduced alignment tolerances can be achieved by periodically repeating the phase mask to cover a beam area at the intermediate image plane.

Accordingly, in the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. The specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An optical apparatus configured to reduce perceived speckle in images produced by an image projection device comprising the optical apparatus, comprising:
one or more optical elements configured create an intermediate image plane with light received from the image projection device; and
a static two-dimensional diffractive optical element, disposed at the intermediate image plane, having a phase mask comprising periodically repeated unit cells along a pattern area, the pattern area being greater in size than a beam size of the light received from the image projection device at the intermediate image plane.

2. The optical apparatus of claim 1, wherein each periodically repeated unit cell of the phase mask comprises a transitional surface running between subcell elements of each periodically repeated unit cell, wherein the transitional surface is one of defined by a continuous function or comprises a plurality of steps approximating a continuous surface.

3. The optical apparatus of claim 2, wherein the each periodically repeated unit cell of the phase mask comprises alternating subcell elements that differ by Pi radians.

4. The optical apparatus of claim 3, wherein the each periodically repeated unit cell of the phase mask comprises at least two zero radian phase subcell elements and at least two PI radian phase subcell elements.

5. The optical apparatus of claim 2, wherein each periodically repeated unit cell of the phase mask comprises a surface defined by a vortex phase function.

6. The optical apparatus of claim 2, wherein each periodically repeated unit cell of the phase mask comprises a surface defined by a Hermite-Gaussian phase function.

7. The optical apparatus of claim 2, wherein connected but non-adjacent subcell elements are joined by a continuous or approximately continuous saddle-shaped phase transition.

8. The optical apparatus of claim 1, wherein the static two-dimensional diffractive optical element increases the $C_6$ value associated with the light received from the image projection device by at least twenty-percent.

9. The optical apparatus of claim 1, wherein the one or more optical elements comprise a plurality of telescoping lenses.

10. The optical apparatus of claim 1, wherein the one or more optical elements comprise an off-axis parabola.

11. The optical apparatus of claim 1, wherein the one or more optical elements comprise a collimator relay.

12. The optical apparatus of claim 1, wherein a period of repetition for the periodically repeated unit cells is proportional to the beam size of the light received from the image projection device.

13. The optical apparatus of claim 1, wherein the periodically repeated unit cells comprise periodically repeated phase masks.

14. A laser imaging system having reduced speckle, comprising:
one or more laser sources configured to emit one or more light beams;
a light modulator configured to produce images on a projection surface with the one or more light beams;
one or more optical elements configured to create an intermediate image plane along a light axis running between the one or more laser sources and the light modulator; and
a passive static diffractive optical element disposed at the intermediate image plane and comprising a periodically repeated phase unit cell;
wherein each element of the periodically repeated phase unit cell is joined to each adjacent element of the periodically repeated phase unit cell by a grey-level phase transition surface.

15. The laser imaging system of claim 14, wherein the light modulator comprises a MEMS scanning mirror.

16. The laser imaging system of claim 15, wherein the one or more optical elements comprise an isotropic element having a parabolic reflector.

17. The laser imaging system of claim 16, wherein the isotropic element comprises a first major face disposed adjacent to the passive static diffractive optical element and a second major face comprising the parabolic reflector, wherein the one or more light beams enter the isotropic element through the first major face, are reflected off the parabolic reflector to the passive static diffractive optical element back to the parabolic reflector and out of the isotropic element through the first major face.

18. The laser imaging system of claim 17, further comprising one or more optical alignment devices configured to orient the one or more light beams as collinear light.

19. The laser imaging system of claim 18, wherein the periodically repeated phase unit cell is disposed along a pattern area that exceeds a beam size of the one or more light beams at the intermediate image plane.

20. The laser imaging system of claim 14, wherein the passive static diffractive optical element comprises one or more passive static diffractive elements corresponding to the one or more laser sources on a one-to-one basis, wherein a $C_6$ value associated with each of the one or more laser sources is increased by the one or more passive static diffractive elements.

* * * * *